(12) United States Patent
Yamazaki

(10) Patent No.: US 7,362,916 B2
(45) Date of Patent: Apr. 22, 2008

(54) RADIATION IMAGING METHOD, RADIATION IMAGING APPARATUS, COMPUTER PROGRAM AND COMPUTER-READABLE RECORDING MEDIUM

(75) Inventor: Tatsuya Yamazaki, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 715 days.

(21) Appl. No.: 10/865,006

(22) Filed: Jun. 10, 2004

(65) Prior Publication Data

US 2004/0252874 A1 Dec. 16, 2004

(30) Foreign Application Priority Data

Jun. 13, 2003 (JP) .............................. 2003-169725

(51) Int. Cl.
*G06K 9/40* (2006.01)
*G06K 9/00* (2006.01)
*H04N 9/64* (2006.01)

(52) U.S. Cl. ...................... 382/275; 382/149; 382/274; 348/246

(58) Field of Classification Search ................ 382/275, 382/132, 149, 274; 348/241–252; 378/208, 378/98.8; 702/116
See application file for complete search history.

(56) References Cited

U.S. PATENT DOCUMENTS

| | | | | |
|---|---|---|---|---|
| 4,983,822 A | * | 1/1991 | Fukuchi | 250/223 B |
| 6,296,387 B1 | * | 10/2001 | Guillemaud | 378/207 |
| 6,307,393 B1 | * | 10/2001 | Shimura | 324/765 |
| 6,404,853 B1 | | 6/2002 | Odogba et al. | 378/98.8 |
| 6,526,366 B1 | | 2/2003 | Dunton | 702/116 |

| | | | |
|---|---|---|---|
| 2001/0031098 A1 | 10/2001 | Ford | 382/275 |

FOREIGN PATENT DOCUMENTS

| | | |
|---|---|---|
| EP | 0 313 278 | 4/1989 |
| JP | 2712495 | 10/1997 |
| JP | 2001-8106 | 1/2001 |
| JP | 2001-8107 | 1/2001 |
| JP | 2002-34961 | 2/2002 |

OTHER PUBLICATIONS

English Abstract for Japanese Laid-Open Patent Application No. 2002-34961.
English Abstract for Japanese Laid-Open Patent Application No. 2001-8106.
English Abstract for Japanese Laid-Open Patent Application No. 2001-8107.
English Abstract for Japanese Laid-Open Patent Application No. 02-224745 (corresponds to JP 2712495).

* cited by examiner

*Primary Examiner*—Matthew C. Bella
*Assistant Examiner*—Randolph Chu
(74) *Attorney, Agent, or Firm*—Morgan & Finnegan, LLP

(57) ABSTRACT

The present invention prevents useless defect correction from being effected on pixels for obtaining a radiation image, to thereby improve the reliability of the radiation image provided for diagnosis.

An initial defect map 1 in which a defective pixel extracted during shipment from a factory is registered, a QC defect map 2 in which a defective pixel extracted during periodical inspection in the market is registered, and a pseudo-defect map 3 in which a pseudo-defective pixel of abnormal sensitivity extracted during the shipment from the factory is registered are prepared to thereby enable the pseudo-defective pixel registered in the pseudo-defect map 3 to be eliminated from the object of defect correction so that useless defect correction can be curtailed.

9 Claims, 9 Drawing Sheets

FIG. 2

| IN | | OUT |
|---|---|---|
| A | B | X |
| 0 | 1 | 0 |
| 0 | 0 | 0 |
| 1 | 1 | 1 |
| 1 | 0 | 0 |

| 1/16 | 1/16 | 1/16 |
|---|---|---|
| 1/16 | 1/2 | 1/16 |
| 1/16 | 1/16 | 1/16 |

| 1/14 | 1/14 | 1/14 |
|---|---|---|
| 1/14 | 1/2 | 0 |
| 1/14 | 1/14 | 1/14 |

| 1/12 | 1/12 | 1/12 |
|---|---|---|
| 0 | 1/2 | 0 |
| 1/12 | 1/12 | 1/12 |

43

Background Art

RADIATION IMAGING METHOD, RADIATION IMAGING APPARATUS, COMPUTER PROGRAM AND COMPUTER-READABLE RECORDING MEDIUM

CROSS-REFERENCE TO RELATED APPLICATIONS

The present application claims priority under 35 U.S.C. §119 to Japanese Patent Application No. 2003-169725 filed on Jun. 13, 2003, the entire content of which being hereby incorporated herein by reference.

BACKGROUND OF THE INVENTION

1. Field of the Invention

This invention relates to a radiation imaging method, a radiation imaging apparatus, a computer program and a computer-readable recording medium, and particularly is suitable for use for correcting the defect of a function in the pixel of a radiation detector.

2. Related Background Art

As a radiation imaging apparatus for imaging a radiation image transmitted through an object, use has heretofore been made of an imaging apparatus called a screen-film system (S/F system) in which an intensifying screen for converting radiation into fluorescence and photographic film are brought into close contact with each other.

An X-ray image intensifier-television (XII-TV) imaging apparatus for imaging a radiographic image with a combination of a fluorescent material, an image intensifier, an optical system and an image pickup tube has also been used.

The former has been primarily used in general radiography, and the latter has been primarily used in fluoroscopy or angiography.

Recently, a digital imaging apparatus having the function of outputting a digital image has been available from the demand for the digitization of an image.

A computed radiography apparatus using an imaging plate for accumulating a radiation image as a latent image, laser-scanning this imaging plate to thereby excite the latent image, and reading fluorescence produced thereby by a photomultiplier has also been used in general radiography substituting the aforedescribed screen-film systems.

Also, II-DR (image intensifier-digital radiography) apparatus using a solid state image pickup element such as a charge coupled device (CCD) instead of an image pickup tube has also been available in fluoroscopy and angiography.

Both of such a computed radiography apparatus and the I.I.-DR imaging apparatus have the function of outputting a digital image, and begin to contribute to the digitization of a medical image.

Further, recently, there has been put into practical use a digital imaging apparatus for directly digitizing a radiation image without the intermediary of an optical system or the like, by the use of a so-called flat panel detector (FPD) in which a fluorescent material and a large-area amorphous silicon sensor are brought into close contact with each other.

There has also been likewise put into practical use an FPD for converting radiation into an electron by the use of amorphous selenium, lead iodide ($PbI_2$) and mercury iodide ($HgI_2$), and detecting the electron by a large-area amorphous silicon sensor.

Both of these FPDs are very similar in principle to each other, and the former is called an indirect type and the latter is called a direct type.

In the FPD, a portion for capturing an X-ray and converting it into a secondary quantum is called a primary sensor, and in the indirect type, it is a fluorescent material, whereas in the direct type, it is amorphous selenium or the like.

On the other hand, a portion for detecting a secondary quantum is called a secondary sensor, and in the indirect type, it is an optical sensor provided with an amorphous silicon thin film transistor (TFT) array, a light-receiving portion and a charge accumulating portion, whereas in the direct type, it is a charge sensor provided with an amorphous silicon TFT array and a charge accumulating portion.

These FPDs are theoretically capable of imaging not only a still image but also a moving image and therefore are expected as the digital imaging apparatuses of the next generation.

The principle of the reading operation of the secondary sensor used in the FPD will now be described briefly with reference to FIG. 7 of the accompanying drawings. In FIG. 7, for simplicity, a secondary sensor comprising nine pixels is shown.

In FIG. 7, the reference characters 71$a$-71$i$ designate photoelectric converting portions for converting fluorescence into an electron, the reference characters 72$a$-72$i$ denote thin film transistors (TFTs) for forwarding the electrons produced in the photoelectric converting portions, the reference numeral 73 designates a bias line for giving a bias voltage to the photoelectric converting portions 71$a$-71$i$, the reference characters 74$a$, 74$b$ and 74$c$ denote gate lines for transmitting a switching signal to the TFTs 72$a$-72$i$, the reference characters 75$a$, 75$b$ and 75$c$ designate signal lines for forwarding electrons passed through the TFTs 72$a$-72$i$, the reference numeral 76 denotes a read-out device for selecting a signal line from among the signal lines 75$a$, 75$b$ and 75$c$ and amplifying a signal electron, the reference numeral 77 designates an analog-to-digital converter (A/D converter) for converting the amplified analog signal into a digital signal, and the reference numeral 78 denotes a gate driving unit for controlling the switching operation of the TFTs 72$a$-72$i$.

In FIG. 7, when radiation is exposed to a fluorescent material, not shown, covering the whole surface of the pixel of the secondary sensor, the fluorescent material emits fluorescence proportional to the intensity thereof. The photoelectric converting portions 71$a$-71$i$ capture this fluorescence and convert it into a signal electron. When the gate driving unit 78 makes the gate line 74$a$ High, a row of TFTs 71$a$-71$c$ connected to this gate line 74$a$ all become ON. Thereupon, the signal electrons accumulated in the photoelectric converting portions 71$a$-71$c$ are forwarded to the signal lines 75$a$, 75$b$ and 75$c$, respectively.

The read-out device 76, when it selects the signal line 75$a$, amplifies and reads the signal electron forwarded to this signal line 75$a$. The signal electron read by the read-out device 76 is converted into a digital signal by the A/D converter 77.

Subsequently, the read-out device 76 selects the signal lines 75$b$ and 75$c$ in succession, and reads the signal electrons forwarded to the respective signal lines 75$b$ and 75$c$ in succession.

By this operation, the signal electrons of three pixels corresponding to a row connected to the gate line 74$a$ are read and converted into a digital signal.

Next, the gate lines 74$b$ and 74$c$ are successively selected, and the signal electrons of three pixels corresponding to a row connected to the gate lines 74$b$ and 74$c$, respectively, like the pixels connected to the gate line 74a, are successively read and converted into digital signals.

FIG. 8 of the accompanying drawings shows an equivalent circuit simulating a pixel of a metal insulator semiconductor (MIS) type secondary sensor.

In FIG. 8, the reference numeral 71 designates a photoelectric converting portion, the reference numeral 72 denotes a TFT, the reference numeral 73 designates a bias line, the reference numeral 76 denotes a read-out device, the reference numeral 82 designates an upper electrode (D electrode) for transmitting a bias voltage to the photoelectric converting portion 71, the reference numeral 83 denotes an n+dope layer being of the same potential as the upper electrode 82 and blocking the injection of a hole into a-Si intrinsic semiconductor i layer 84, the reference numeral 84 designates the a-Si intrinsic semiconductor i layer for effecting photoelectric conversion, the reference numeral 85 denotes an insulating layer for blocking the movement of an electron and a hole, and the reference numeral 86 designates a lower electrode (G electrode).

The secondary sensor used in the FPD comprises millions of pixels, but the characteristic of each pixel differs delicately. Particularly, an important characteristic as an image sensor is a dark current (distribution) and a sensitivity characteristic (distribution). A sensitivity characteristic (distribution) also exists in the primary sensor.

So, in the FPD, the step of correcting these characteristics (correcting step) is carried out so as to provide a sensor in which the characteristics of the respective pixels are substantially uniform. This correcting step is substantially common to both of the aforedescribed indirect type and direct type. Description will hereinafter be made of methods of correcting the dark current and the sensitivity characteristic.

The method of correcting the dark current will first be described. Here, the dark current is a current measured when there no input to the sensor, and it is to be understood that it comprises a random component and a stationary offset component.

Assuming that the dark current does not depend on a sensor input, an image when a signal is not inputted to the sensor is subtracted from an image when a signal has been inputted to the sensor, whereby the correction of the offset component of the dark current differing in each pixel becomes possible.

A radiation image when a signal has been inputted to the sensor is defined as X (x,y) and a dark current image measured immediately thereafter is defined as Dx(x,y), a primary dark current corrected image Cx(x,y) after the dark current has been corrected is represented by the following expression (1). In expression (1), x,y is the address of two-dimensionally arranged pixels.

$$Cx(x,y) = X(x,y) - Dx(x,y) \quad (1)$$

The correction of the sensitivity characteristic will be described hereafter. The sensitivity correction is sometimes called calibration. The sensitivity correction is the step of correcting the unevenness of the sensitivity of the pixels constituting the sensor, and generally the sensitivity of the primary sensor and the sensitivity of the secondary sensor are corrected at a time.

Assuming that the sensitivity is stationary, the image when a signal has been inputted to the sensor is divided by an image when a uniform input has been given to the sensor, whereby the correction of the sensitivity differing in each pixel becomes possible.

An image when a uniform input has been given to the sensor is defined as Cw(x,y), and a radiation image component and a dark current image component included in the image Cw(x,y) when the uniform input has been given to the sensor are defined as W(x,y) and Dw(x,y), respectively, a sensitivity-corrected image C(x,y) is represented by the following expression (2). In expression (2), the upper line represents an average value.

$$C(x,y) = \frac{\overline{Cw(x,y)}}{Cw(x,y)} \cdot Cx(x,y) \quad (2)$$

When expression (1) is used, expression (2) is represented as the following expression (3).

$$C(x,y) = \frac{\overline{W(x,y) - Dw(x,y)}}{W(x,y) - Dw(x,y)} \cdot \{X(x,y) - Dx(x,y)\} \quad (3)$$

In a radiation imaging apparatus, it is usual to apply uniform radiation for sensitivity correction. However, at a dosage level utilized in radiation image diagnosis, a quantum noise proportional to the square root of the number of radiation quanta is superimposed on the radiation image. This quantum noise is unavoidable in principle and therefore, the quantum noise is of course also superimposed on the image Cw(x,y) when a uniform input has been given to the sensor. That is, it is feared that the accuracy of sensitivity correction is aggravated by the quantum noise superimposed on the image Cw(x,y) when a uniform input has been given to the sensor.

So, generally, for the purpose of sensitivity correction, it is practised to effect the averaging of images obtained by a plurality of exposures, and increase the number of actually effective radiation quanta included in the image Cw(x,y) when a uniform input has been given to the sensor to thereby improve the accuracy of sensitivity correction.

In addition, not all of the millions of pixels constituting the secondary sensor used in the FPD always operate, but a finite number of defective pixels are included therein. An appropriate number of defective pixels are allowed with the influence upon diagnosis, the yield and cost taken into account. The defective pixels of the secondary sensor are caused by the leak due to the malfunctions of the TFTs 72a-72i, or the opening or mutual short-circuiting of the bias line 73, the gate line 74 and the signal line 75. Accordingly, there are diversified defective modes. The outputs of these defective pixels are often not correlated with the outputs of normal pixels. Also, in some cases, the outputs fluctuate at random.

Likewise, a finite number of defective pixels also exist in the primary sensor such as a fluorescent material or amorphous selenium use in the FPD.

In the case of the fluorescent material, there is a defective mode in which a foreign substance gets mixed in a fluorescent material layer and light is attenuated. Also, in the case of columnar cesium iodide (CsI) fluorescent material, there is a defect mode in which sensitivity is locally varied by the abnormality of crystal growth. Further, in the case of amorphous selenium, it is said that there is a defect mode in which a pinhole is produced during evaporation and thousands of volts of bias is short-circuited by the pinhole.

The defective pixels are interpolated by the utilization of the outputs of neighboring pixels surrounding the defective pixels. In the case of such isolated point defect as shown, for example, in FIG. 9 of the accompanying drawings that a defect exists in only the central pixel 90, it is usual that the defect is corrected by the use of the average value of neighboring eight pixels.

It is also possible to effect defect correction adaptively in conformity with the outputs of the neighboring pixels. For example, when it is estimated from the information of the neighboring pixels that the edges thereof overlap the defective pixels, it is also possible to regard the result of a calculation effected so as to sharply reproduce the edges as the outputs of the defective pixels.

The definition of the defect is considered to differ depending on the radiation imaging apparatus, but generally an image when uniform radiation is exposed to the FPD is used. This image is fluctuated by the sensitivity characteristic of the FPD or quantum noise and has finite standard deviation. However, the defective pixels often present an output exceeding the degree of these fluctuations. So, in the image when uniform radiation is exposed to the FPD, there is conceived a method of setting the region of interest (ROI) of e.g. 128×128 pixels, obtaining an average value m in the ROI and standard deviation σ, and defining a pixel of which the output exceeds (m±5σ) as a defect. There is also conceived a method of defining a pixel of which the output exceeds (m±0.2 m) as a defect. There is also conceived a method of likewise detecting a defective pixel by the utilization of a dark current image obtained when radiation is not exposed to the FPD.

It is empirically confirmed that these defects are hardly deteriorated in both number and degree within the life range of the apparatus in an ordinary state of use. So, during the shipment from a factory, a defect map is prepared and by the interpolating process, the output of a defective pixel is substituted for an input estimated to be correct. Also, with a rare increase in defects taken into account, the defect map is renewed during periodical inspection or the like in the market.

In Japanese Patent No. 2712495, there is disclosed a method of pre-storing a defective position attributable to an image intensifier (I.I.) and a television (TV) camera for picking up the output optical image of the image intensifier, and compensating for a diagnostic image on the basis of the stored defective position.

Also, in Japanese Patent Application Laid-Open No. 2001-8106 and Japanese Patent Application Laid-Open No. 2001-8107, there is disclosed a method of registering a defect during the shipment from a factory as an initial defect map, further newly preparing a defect map during periodical inspection or the like, preparing a combined defect map from the two, and effecting the correction of the defective pixel of a diagnostic image (defect correcting step).

These defect correcting steps will now be described with reference to FIG. 10 of the accompanying drawings.

In FIG. 10, the reference numeral 31 designates a defect correction program, the reference numeral 32 denotes an initial defect map produced during the shipment from a factory, the reference numeral 33 designates a QC defect map produced during periodical inspection in the market, the reference numeral 34 denotes a photographed image, the reference numeral 35 designates a logical sum step portion, the reference numeral 36 denotes a combined defect map, the reference numeral 37 designates a defect correcting step portion, the reference numeral 38 denotes an interpolated image, the reference numeral 39 designates a substituting step portion, and the reference numeral 40 denotes an image after processed.

In the initial defect map 32 and the QC defect map 33, normal pixels are indicated as white pixels, and defective pixels are indicated as black pixels. It is because an inspecting method and algorithm for producing the initial defect map 32 and the QC defect map 33 differ that the two do not partly coincide with each other.

Also, in the photographed image 34, defective pixels are expressed as white pixels or black pixels with the fact that the output level of the defective pixels is unspecified taken into account.

Inputs to the defect correction program 31 are the initial defect map 32, the QC defect map 33 and the photographed image 34. In the logical sum step portion 35, the combined defect map 36 is produced by the use of the initial defect map 32 and the QC defect map 33. Subsequently, the photographed image 34 and the combined defect map 36 are inputted to the defect correcting step portion 37, and the pixel values of defective pixels are estimated by the interpolating process or the like, and the interpolated image 38 is produced. Lastly, in the substituting step portion 39, only the defective pixels included in the photographed image 34 are substituted for by the interpolated image 38, and the image 40 after processed is produced, and this produced image 40 after processed is outputted from the defect correction program 31.

Now, we have progressed the analysis of the aforedescribed defective mode and have found that in the conventional definition of defect, defects are excessively counted. For example, we have found that in some defect modes in a fluorescent material, the amount of light is simply attenuated and by correcting sensitivity, it is possible to handle the defective pixels as normal pixels.

Likewise, we have found that in a part of the defect mode of the secondary sensor, the output simply lowers (rises) and by correcting sensitivity, it is possible to handle the defective pixels as normal pixels.

That is, we have found that for example, even among pixels of which the output exceeds (m±5σ) or (m±0.2 m) and which are defined as defects by the aforedescribed definition of defect, there exist pseudo-defective pixels which are not defects in practice.

To discern between the pseudo-defective pixels looking defective but normally usable and the true defective pixels, a precise test is necessary. In this case, for example, a method of changing the radiation intensity level and imaging many times to thereby inspect the linearity of the pixel is effective. A method of repeating the same imaging several times to thereby inspect the stability of the output is also effective.

However, it is difficult to perform such inspection at a place whereat the radiation imaging apparatus is installed. Further, it is difficult to discern the pseudo-defective pixels and the (true) defective pixels by periodical inspection performed by a user. So, it is desirable that the step of classifying the pseudo-defective pixels and the defective pixels be executed before the shipment from the factory.

However, if simple defect inspection is performed in the periodical inspection at the place whereat the radiation imaging apparatus is installed, there is the possibility that these pseudo-defective pixels are extracted as defective pixels and the extracted pseudo-defective pixels are additionally registered in the defect map. In principle, some estimation enters the defect correcting process of substituting the pixel value and therefore, the defect correcting process should be limited to the necessary minimum, and it is not desirable that the pseudo-defective pixels be included in the object of defect correction.

Also, some radiation imaging apparatuses have a specification which does not approve any connected defect. In some defect modes in a fluorescent material, the attenuation of the amount of light extends over several pixels. If this is defined as a defect, not only useless defect correction will increase, but also in some cases, there is the possibility that the sensor itself is judged to be a defective article by mistake.

SUMMARY OF THE INVENTION

The conventional defect correcting method has satisfied the dignity of image desired in those days, but to satisfy the dignity of image which has come to be required in recent years, a higher quality image has come to be desired. The present invention has been made in view of the afore-described problems, and has as its object to improve the quality of a radiation image.

The radiation imaging method of the present invention is a radiation imaging method using a radiation detector having a plurality of pixels, characterized by the provision of the initial defect map producing step of an initial defect map in which the initial defective pixel of the radiation detector is registered, the pseudo-defect map producing step of forming a pseudo-defect map in which a pseudo-defective pixel of which only the function of a part need be corrected is registered, the QC defect map producing step of producing a QC defect map in which a defective pixel discovered by periodical inspection is registered, and the combined defect map producing step of producing a combined defect map in which a pixel for effecting defect correction is registered, by the use of the initial defect map, the pseudo-defect map and the QC defect map.

Another feature of the present invention is a radiation imaging method using a radiation detector having a plurality of pixels, provided with the defect map producing step of classifying the pixels of the radiation detector by at least three kinds of defective modes, and producing defect maps corresponding to respective ones thereof, and the image processing step of effecting different image processing by the defect maps.

In such methods, pseudo-defective pixels registered in the pseudo-defect map are excepted from the object of defect correction to thereby curtail useless defect correction.

The radiation imaging apparatus of the present invention is a radiation imaging apparatus provided with a radiation detector having a plurality of pixels, a recording unit for storing the defective pixel map and program of the radiation detector therein, and a controller for effecting control including the operation of executing the program, characterized in that the defective pixel map is an initial defect map in which an initial defective pixel is registered, a pseudo-defect map in which a pseudo-defective pixel of which only the function of a part need be corrected is registered, and a QC defect map in which a defective pixel discovered by periodical inspection is registered, and the controller produces a combined defect map in which a pixel for effecting defect correction is registered, by the use of the initial defect map, the pseudo-defect map and the QC defect map, and stores it in the recording unit.

Another feature of the present invention is a radiation imaging apparatus provided with a radiation detector having a plurality of pixels, a recording unit for storing therein the defective pixel map and program of the radiation detector, and a controller for effecting control including the operation of executing the program, wherein the controller classifies the pixels of the radiation detector by at least three kinds of defect modes, produces defect maps corresponding to respective ones thereof, and effects different image processing by the defect maps.

The computer program of the present invention is characterized by causing a computer to execute the initial defect map producing step of producing an initial defect map in which the initial defective pixel of a radiation detector having a plurality of pixels is registered, the pseudo-defect map producing step of producing a pseudo-defect map in which a pseudo-defective pixel of which only the function of a part need be corrected is registered, the QC defect map producing step of producing a QC defect map in which a defective pixel discovered by periodical inspection is registered, and the combined defect map producing step of producing a combined defect map in which a pixel for effecting defect correction is registered, by the use of the initial defect map, the pseudo-defect map and the QC defect map.

The computer-readable recording medium of the present invention is characterized by having the above-described computer program recorded therein.

Other objects, features and advantages of the present invention will become apparent from the following description taken in conjunction with the accompanying drawings, throughout which like reference characters designate the same or similar parts.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 2 shows the first embodiment of the present invention, and shows an example of a truth table for classifying a defect and a pseudo-defect.

FIGS. 3A, 3B and 3C show a second embodiment of the present invention, and illustrate filter processing effected after sensitivity correction.

DESCRIPTION OF THE PREFERRED EMBODIMENTS

First Embodiment

A first embodiment of the present invention will now be described with reference to the drawings.

In a radiation imaging method (defect correcting method) according to the present embodiment, two kinds of defect maps to be registered during shipment from a factory are produced in conformity with a defect mode. One of these two kinds of defect maps is an initial defect map having only defective pixels which do not function, and the other is a pseudo-defect map having only pseudo-defective pixels of abnormal sensitivity. By the pseudo-defective pixels being excepted from the object of defect correction, the number of pixels for effecting defect correction can be decreased. The pseudo-defective pixels are levelled by ordinary sensitivity correction.

The radiation imaging method (defect correcting method) according to the present embodiment will hereinafter be described with reference to FIG. 1.

Figure 1:
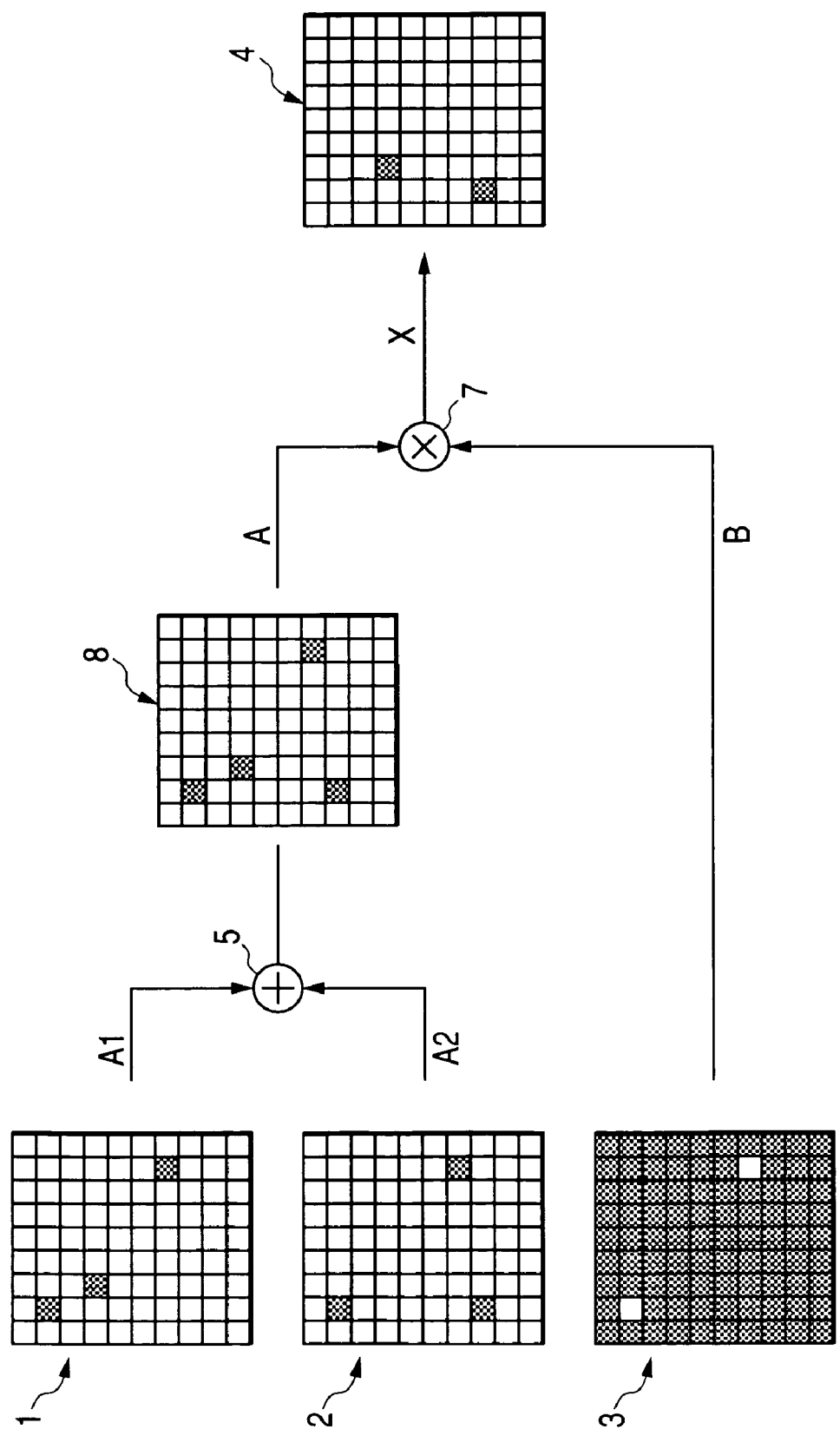
FIG. 1 shows a first embodiment of the present invention, and illustrates an example of an algorithm when a combined defect map is produced.

In FIG. 1, the reference numeral 1 designates an initial defect map, the reference numeral 2 denotes a QC defect map, the reference numeral 3 designates a pseudo-defect map, the reference numeral 4 denotes a combined defect map, the reference numeral 5 designates a logical sum step portion, the reference numeral 7 denotes a logical product step portion, and the reference numeral 8 designates an intermediate defect map.

During the shipment from the factory, an initial defect map 1 and a pseudo-defect map 3 are produced and are stored in a radiation imaging apparatus. As an example of a method of producing the initial defect map 1 and the pseudo-defect map 3, ROI of 128×128 pixels is first set in an image when uniform radiation is exposed to an FPD (hereinafter referred to as the uniformly exposed image), and an average value m in the ROI is obtained, and a sensitivity ratio Sen(x,y) to a marked defect candidate p(x,y) is obtained. Then, pixels of which the sensitivity ratio Sen(x,y) has exceeded 1±0.2 are registered as defect candidates in the initial defect map 1.

Next, a plurality of uniformly exposed images are photographed to thereby evaluate the stability of the pixels which have become the defect candidates. When the average value of a plurality of marked defect candidates p(x,y) is defined as M(x,y) and the degree of stability obtained from the ratio between the standard deviation and the average value M(x,y) of a plurality of marked defect candidates p(x,y) is defined as Sta(x,y), it is to be understood that a pixel of which the degree of stability Sta(x,y) does not exceed ±0.01 is stationary.

Table 1 below shows the classification of defects and pseudo-defects.

Also, the definitions of an average value m, sensitivity ratio Sen(x,y), the average value M(x,y) of marked defect candidates p(x,y) over a plurality of sheets, and degree of stability Sta(x,y) are shown in expressions (4) to (7), respectively.

However, in expressions (4) to (7), x and y represent the addresses of pixels, X and Y represent the number of pixels of ROI, and N represents the number of times of imaging.

Also, it is preferable that defective pixels (pseudo-defective pixels) regarded as pseudo-defects in the classification of Table 1 are deleted from an initial defect map 1 and registered in a pseudo-defect map 3. However, as will be described later (see FIG. 6 and an expression (8)), pixels overlapping the pseudo-defective pixels registered in the pseudo-defect map 3 can be excepted from the object of defect correction and therefore, need not be deleted from the initial defect map 1, but the pseudo-defective pixels may be registered in the pseudo-defect map 3.

$$m = \frac{\sum_{n=1}^{N} \sum_{x=1}^{X} \sum_{y=1}^{Y} P(x, y, n)}{N \times X \times Y} \quad (4)$$

$$Sen(x, y) = \frac{\sum_{i=1}^{N} P(x, y, n)}{m \times N} \quad (5)$$

$$M(x, y) = \frac{\sum_{n=1}^{N} P(x, y, n)}{N} \quad (6)$$

$$Sta^2(x, y) = \frac{\sum_{n=1}^{N} \{P(x, y, n) - M(x, y)\}^2}{(N - 1) \times M^2(x, y)} \quad (7)$$

TABLE 1

| Sensitivity Ratio Sen | Stability Sta | Classification |
| --- | --- | --- |
| 1.5 < Sen | N.A. | Defect |
| 1.2 < Sen ≦ 1.5 | +0.01 < Sta | Defect |
| 1.2 < Sen ≦ 1.5 | Sta ≦ +0.01 | Pseudo-defect |
| 0.8 ≦ Sen ≦ 1.2 | N.A. | Normal |
| 0.5 ≦ Sen < 0.8 | Sta ≦ +0.01 | Pseudo-defect |
| 0.5 ≦ Sen < 0.8 | +0.01 < Sta | Defect |
| Sen < 0.5 | N.A. | Defect |

It should be noted that 1±0.2 in Sensitivity Ratio Sen in Table 1 is the criteria by which the abnormal pixels of the secondary sensor are eliminated as defects. That is, pixels of which the sensitivity ratio Sen is not within a range of 0.8 to 1.2 are defined as defect candidates.

Also, 1±0.5 is the criteria by which the abnormal sensitivity pixels of the primary sensor are eliminated as defects. That is, of the aforedescribed defect candidate pixels, pixels of which the sensitivity ratio Sen is not within a range of 0.5 to 1.5 are defined as defects.

Also, if the degree of stability Sta does not exceed ±0.01, it is possible to sufficiently correct up to the sensitivity ratio Sen of 1±0.5 (0.5 to 1.5) by sensitivity correction. Accordingly, of the aforedescribed defect candidate pixels, pixels of which the degree of stability Sta does not exceed ±0.01 are defined as pseudo-defective pixels.

There is substantially no problem even if for example, the sensitivity ratio Sen is 0.2, but quintuple correction becomes necessary in sensitivity correction, and with the fact that SNR (S/N ratio) is aggravated five times taken into account, such pixels are defined as defects for safety. Also, there is substantially no problem even if the sensitivity ratio is of the order of 2, but with the fact that the saturation of the A/D converter 77 is reached quickly taken into account, such pixels are defined as defects for safety. Accordingly, the criteria of the degree of stability for defining as pseudo-defective pixels is not restricted to +0.01.

Likewise, a dark current image is also used to extract a defective pixel, which is registered in the initial defect map 1. Classification using standard deviation σ in the ROI is also possible.

Next, the user performs periodical inspection after the radiation imaging apparatus has been installed in the market, and the QC defect map 2 is produced. As an example of a method of producing the QC defect map 2 by periodical inspection, in a uniformly exposed image, ROI of 128×128 pixels is set, and an average value m in this ROI is obtained, and a pixel of which the sensitivity ratio Sen exceeds 1±0.3 is registered as a defective pixel in the QC defect map 2. The dark current image is also used to likewise extract a defective pixel, which is registered in the QC defect map 2. It is not realistic to make the user carry out radiation imaging repetitively and therefore, it is a feature to alleviate the criteria instead of limiting the number of times of imaging.

Subsequently, in the logical sum step portion 5, the logical sum of the initial defect map 1 and the QC defect map 2 is calculated to thereby produce an intermediate defect map 8.

Next, in a logical product step portion, the logical product of the intermediate defect map 8 and the pseudo-defect map 3 is calculated to thereby produce a combined defect map 4.

In the initial defect map 1 and the QC defect map 2, normal pixels are displayed as white pixels and defective pixels are displayed as black pixels. Also, in the pseudo-defect map 3, pseudo-defective pixels are displayed as white pixels.

Figure 2:
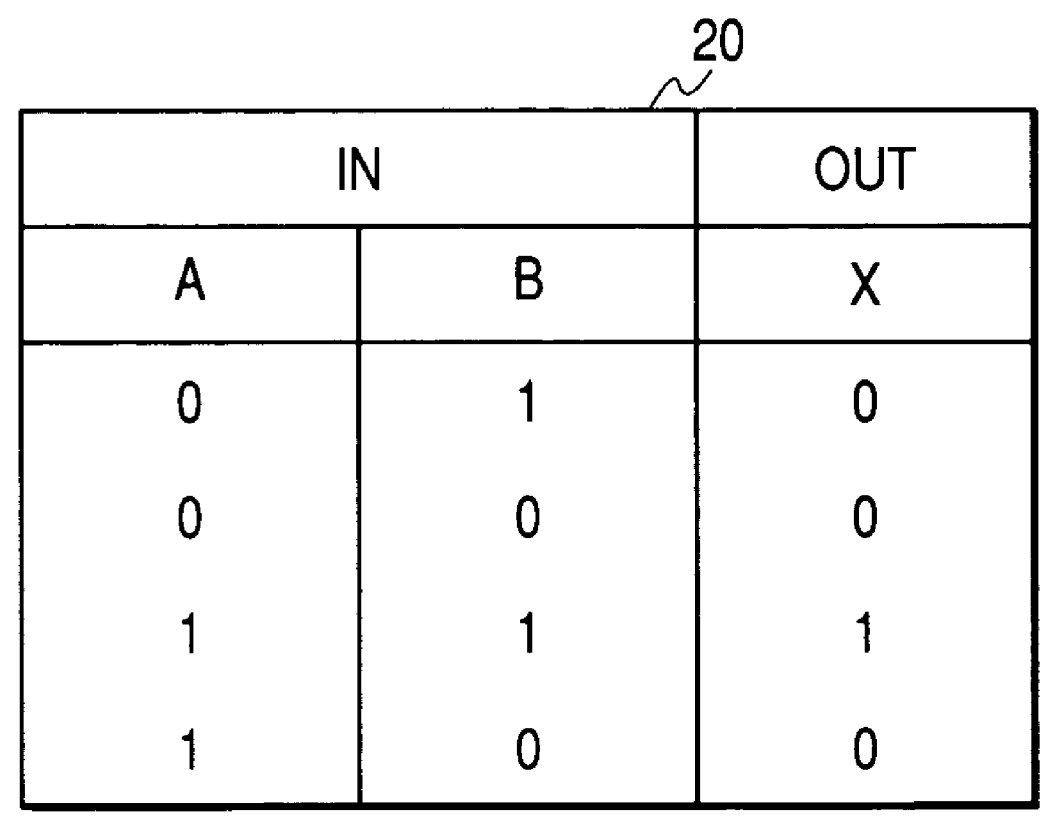

FIG. 2 shows truth values when an input A and an input B are the values of the intermediate defect map 8 and the pseudo-defect map 3, respectively, and an output X is the value of the combined defect map 4.

In the truth table 20 of FIG. 2, the output X is represented by the following expression (8).

$$X = A \times B \quad (8)$$
$$= (A1 + A2) \times B$$

However, in expression (8), the symbol × represents that logical product calculation is effected, and the symbol + represents that logical sum calculation is effected.

Also, A1 is the value of the initial defect map 1, and A2 is the value of the QC defect map 2.

A pixel of which the input A is 0 is a normal pixel, and a pixel of which the input A is 1 is an abnormal pixel. Also, a pixel of which the input B is 0 is a pseudo-defective pixel. Also, a pixel of which the output X is 0 is an unregistered pixel not registered in the combined defect map 4, and a pixel of which the output X is 1 is a registered pixel registered in the combined defect map 4. In the conventional defect correction, when the input A is 1, defect correction has been effected without fail, but in the present embodiment, when the input A is 1 and the input B is 0, the pixel is a pseudo-defective pixel and therefore, defect correction is not effected. Instead, a pseudo-defective pixel has its output practically used like an ordinary pixel and has its sensitivity corrected by the sensitivity correcting step, not shown.

As described above, in the present embodiment, it is possible to prepare the pseudo-defect map 3 and eliminate the pseudo-defective pixel from the object of defect correction to thereby realize the defect correcting step in which useless defect correction is curtailed. Particularly, even if periodical inspection (QC) for discovering any defect is effected in the market, the pseudo-defective pixel is eliminated from the object of defect correction, whereby it is possible to realize the defect correction step in which useless defect correction is curtailed. Thereby, it becomes possible to improve the reliability of a radiation image provided for diagnosis, and also the primary sensor or the secondary sensor can be prevented as much as possible from being judged to be a faulty article.

While in the present embodiment, the initial defect map 1 and the pseudo-defect map 3 have been handled as discrete maps, this does not restrict the scope of the present invention. That is, in the present embodiment, the defect map has been assumed as a binarized image and therefore, the initial defect map 1 and the pseudo-defect map 3 have been handled as discrete maps, but if a multivalued image is used, it is possible to register all these maps in one and the same image.

Also, if a detailed investigation is possible in the market, both of the initial defect map 1 and the pseudo-defect map 3 can also be renewed in the market.

Second Embodiment

A second embodiment of the present invention will now be described.

A radiation imaging method (defect correcting method) according to this embodiment, like the aforedescribed first embodiment, excepts pseudo-defective pixels from the object of defect correction to thereby decrease the number of pixels to be defect-corrected. However, it is a feature of the present embodiment that pseudo-defective pixels are levelled by image processing exclusively for use therefor.

Thus, the present embodiment differs only in the processing method for pseudo-defective pixels from the aforedescribed first embodiment and therefore, portions thereof overlapping those of the aforedescribed first embodiment are given the same reference characters as the reference characters given in FIGS. 1 and 2 and need not be described in detail.

Table 2 below shows the classification of defects and pseudo-defects in the present embodiment. As shown in Table 2, the present embodiment is characterized in that the classification of pseudo-defects is increased to thereby substantially alleviate the standard.

TABLE 2

| Sensitivity Sen | Stability Sta | Classification |
|---|---|---|
| 2 < Sen | N.A. | Defect |
| 1.5 < Sen ≦ 2 | +0.02 < Sta | Defect |
| 1.5 < Sen ≦ 2 | Sta ≦ +0.02 | Second Pseudo-defect |
| 1.2 < Sen ≦ 1.5 | Sta ≦ +0.02 | Second Pseudo-defect |
| 1.2 < Sen ≦ 1.5 | Sta ≦ +0.01 | First Pseudo-defect |
| 0.8 ≦ Sen ≦ 1.2 | N.A. | Normal |
| 0.5 ≦ Sen < 0.8 | Sta ≦ +0.01 | First Pseudo-defect |
| 0.5 ≦ Sen < 0.8 | Sta ≦ +0.02 | Second Pseudo-defect |
| 0.2 ≦ Sen < 0.5 | Sta ≦ +0.02 | Second Pseudo-defect |
| 0.2 ≦ Sen < 0.5 | +0.02 < Sta | Defect |
| Sen < 0.2 | N.A. | Defect |

In Table 2, the first pseudo-defect is similar to the pseudo-defect described in the aforedescribed first embodiment and is not regarded as the object of defect correction. On the other hand, as regards the second pseudo-defect, when simple sensitivity correction is effected, a reduction in SNR (signal-to-noise ratio) is feared and therefore, in the present embodiment, the recovery of SNR is contrived by filter processing after sensitivity correction.

This filter processing will hereinafter be described with reference to FIGS. 3A to 3C.

In FIGS. 3A to 3C, the reference numeral 41 designates a block of 9×9 pixels centering around an isolated defect, the reference numeral 42 denotes a block of 9×9 pixels centering around a duplex defect, and the reference numeral 43 designates a block of 9×9 pixels centering around a triplex defect, and the white pixels are normal pixels, the gray pixels are pixels classified as the second pseudo-defect, and the black pixels are pixels classified as the defect.

The feature of this filter processing is to make the most of both of the pixel value of marked pseudo-defective pixels and the pixel value of normal pixels located around the marked pseudo-defective pixels.

In the isolated defect 41, the process of substituting a pixel value having weighting of ½ effected on the pseudo-defective pixel and having weighting of ⅟₁₆ effected on each of the normal pixels located around it for the pixel value of the pseudo-defective pixel is carried out. In the duplex defect 42, the process of substituting a pixel value having weighting of ½ effected on the pseudo-defective pixel and having weighting of ⅟₁₄ effected on each of the normal pixels around it for the pixel value of the pseudo-defective pixel is carried out. Likewise, in the triplex defective pixel 43, the process of substituting a pixel value having weighting of ½ effected on the pseudo-defective pixel and having weighting of ⅟₁₂ effected on each of the normal pixels around it for the pixel value of the pseudo-defective pixel is carried out.

By such filter processing, it is possible to make the most of both of the pixel value of the pseudo-defective pixel and the pixel value of the normal pixels located around it and therefore, as compared with simple sensitivity correction, the SNR of the pixel value is improved.

Figure 9:
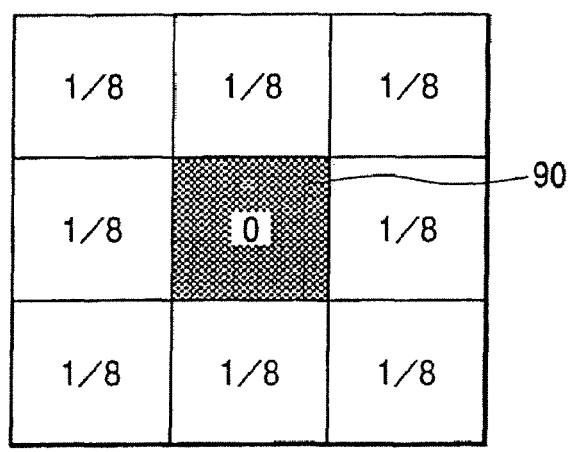
FIG. 9 shows the prior art, and illustrates a correcting process in the case of an isolated point defect.
Figure 10:
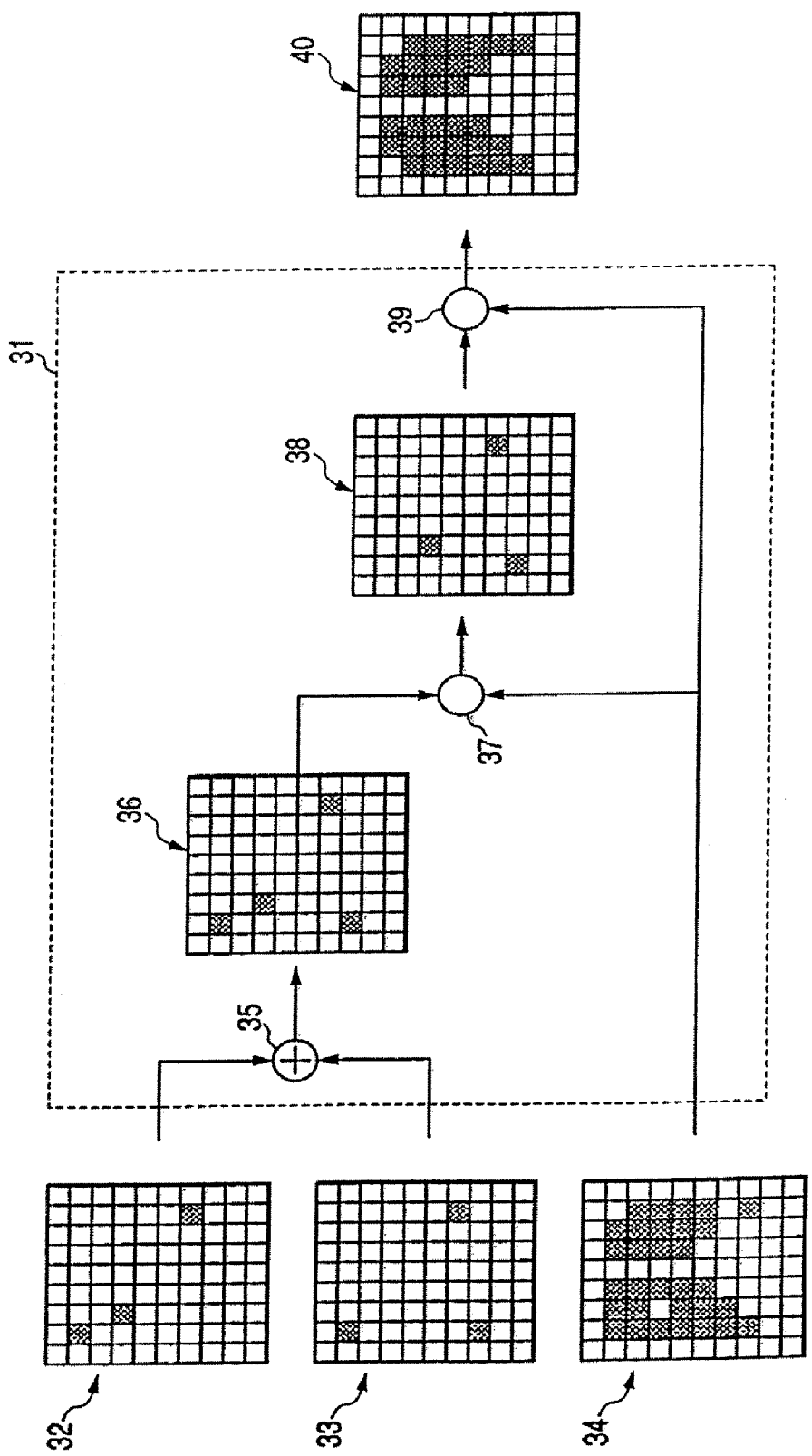
FIG. 10 shows the prior art, and illustrates the ordinary defect correcting step.

Also, there is obtained the effect that as compared with the simple interpolating process shown in FIG. 9, the deterioration of resolution by interpolation can be reduced. The matrix size and coefficient of the filter are not restricted to those shown in FIGS. 3A to 3C, but any matrix size and coefficient are applicable.

Also, the pseudo-defective pixel of which the sensitivity ratio Sen is 2 is saturated early in the A/D converter 77 as compared with the normal pixels and therefore, after it has reached saturation, it is also possible to handle it as a defective pixel to thereby level it, and carry out image processing discretely from the other pseudo-defective pixels.

In Japanese Patent Application Laid-Open No. 2002-34961, there is disclosed the technique of detecting from an image a pixel changing in characteristic during saturation and behaving as a defect, and effecting defect correction. In the present embodiment, however, the levelling process is carried out on a pixel of which the saturation is known in advance to be early, and the present embodiment does not analyze a diagnostic image adaptively when saturation occurs without effecting foreseeing as in the technique described in the aforementioned Japanese Patent Application Laid-Open No. 2002-34961. Accordingly, the defect correction when saturation has occurred can be effected more quickly and reliably than in the technique described in the aforementioned Japanese Patent Application Laid-Open No. 2002-34961.

As described above, in the present embodiment, design is made such that with regard to the pseudo-defective pixels classified as the first pseudo-defect, sensitivity correction is effected, while on the other hand, with regard to the pseudo-defective pixels classified as the second pseudo-defect of which a reduction in the SNR is feared if sensitivity correction is effected, filter processing is carried out after sensitivity correction. That is, design is made such that the pseudo-defective pixels are classified in conformity with the defect mode and the levelling process is carried out by the defect modes and therefore, in addition to the effect in the first embodiment that the number of pixels of which useless defect correction is effected can be curtailed, it is possible to limit a reduction in degree of sharpness and a reduction in SNR in the interpolated pixels.

Third Embodiment

A third embodiment of the present invention will now be described. This embodiment relates to a radiation imaging apparatus for realizing the radiation imaging method (defect correcting method) described in the aforedescribed first and second embodiments and therefore, portions overlapping those in the aforedescribed first and second embodiments and the prior art are given the same reference characters as the reference characters given in FIGS. 1 to 3 and FIGS. 7 to 10 and need not be described in detail.

The radiation imaging apparatus according to the present embodiment will hereinafter be described with reference to FIGS. 4 to 6.

Figure 4:
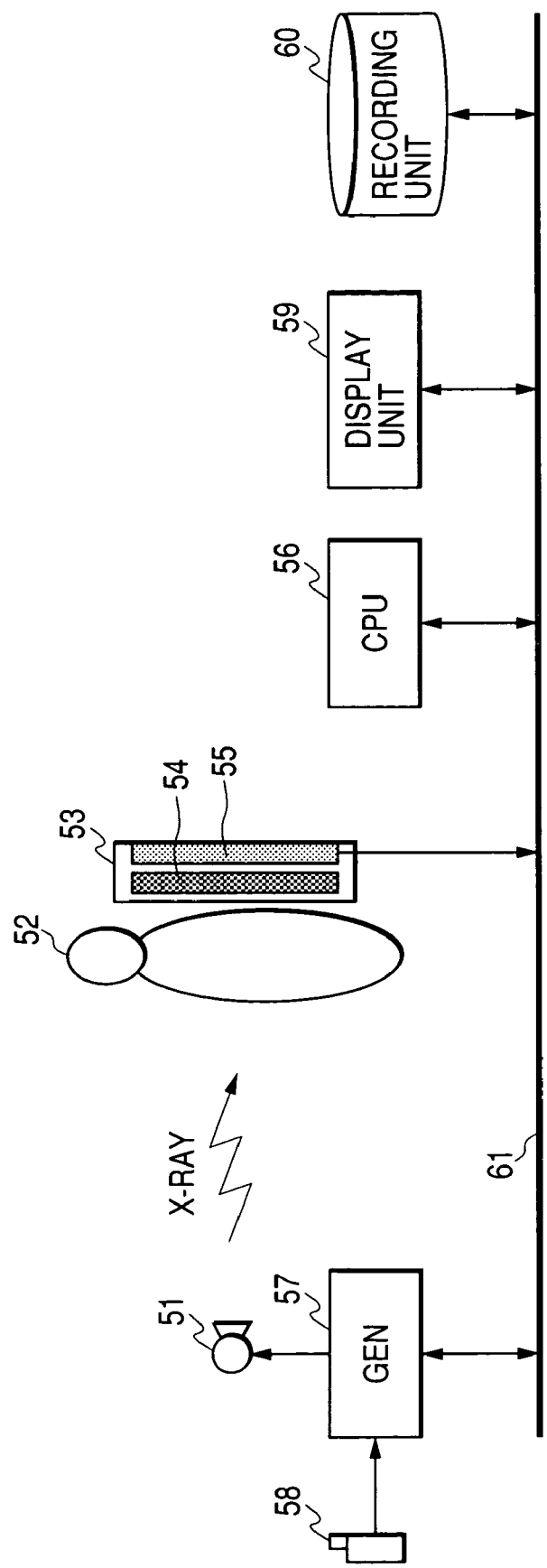
FIG. 4 shows a third embodiment of the present invention, and shows an example of the construction of a radiation imaging apparatus.

FIG. 4 shows an example of the construction of the radiation imaging apparatus according to the present embodiment.

In FIG. 4, the reference numeral 51 designates an X-ray tube, the reference numeral 52 denotes a patient, the reference numeral 53 designates a imaging portion, the reference numeral 54 denotes a grid for eliminating scattered rays, the reference numeral 55 designates a radiation detector for imaging a radiation image, the reference numeral 56 denotes a central processing unit (CPU) for controlling the radiation imaging apparatus, the reference numeral 57 designates a radiation generator, the reference numeral 58 denotes an exposure button for effecting radiation exposure, the reference numeral 59 designates a display unit serving to display the photographed image and also as a user interface (I/F), the reference numeral 60 denotes a recording unit for storing therein information regarding the radiation image and the radiation imaging apparatus, and the reference numeral 61 designates a bus line for linking the units constituting the radiation imaging apparatus together.

Figure 5:
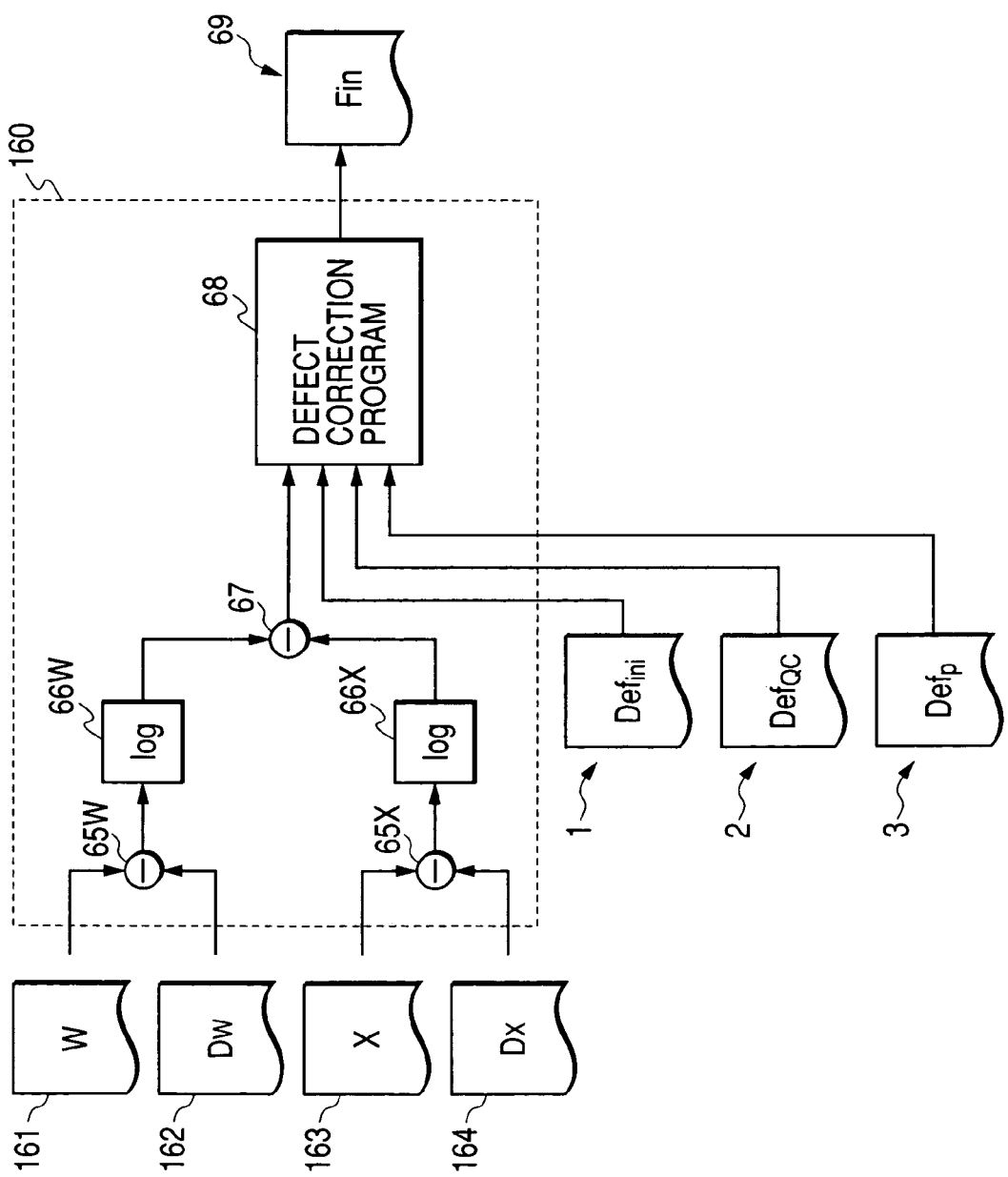
FIG. 5 shows the third embodiment of the present invention, and illustrates processing effected by an pre-processing program.
Figure 6:
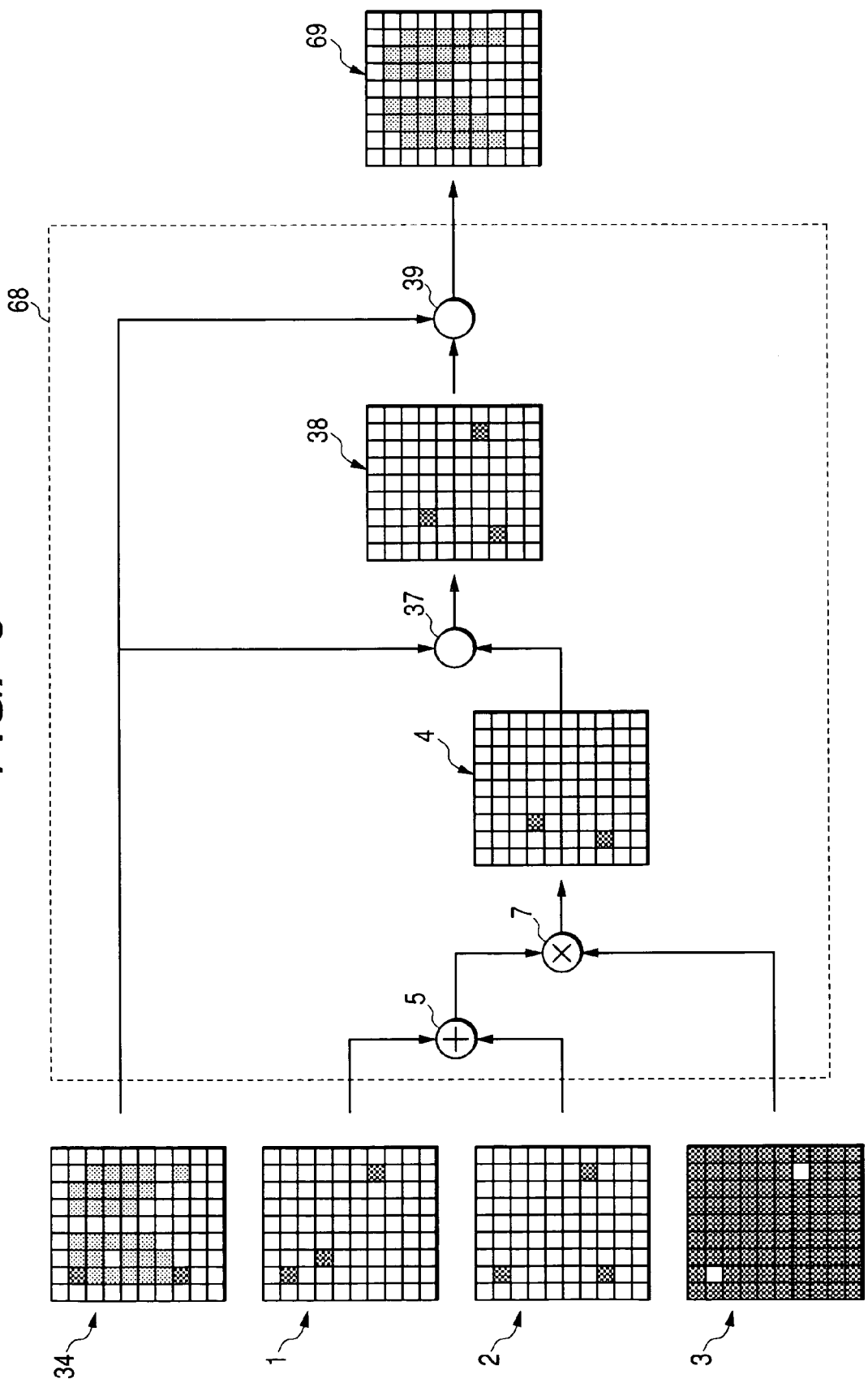
FIG. 6 shows the third embodiment of the present invention, and illustrates the defect correcting step executed by a defect correction program.
Figure 7:
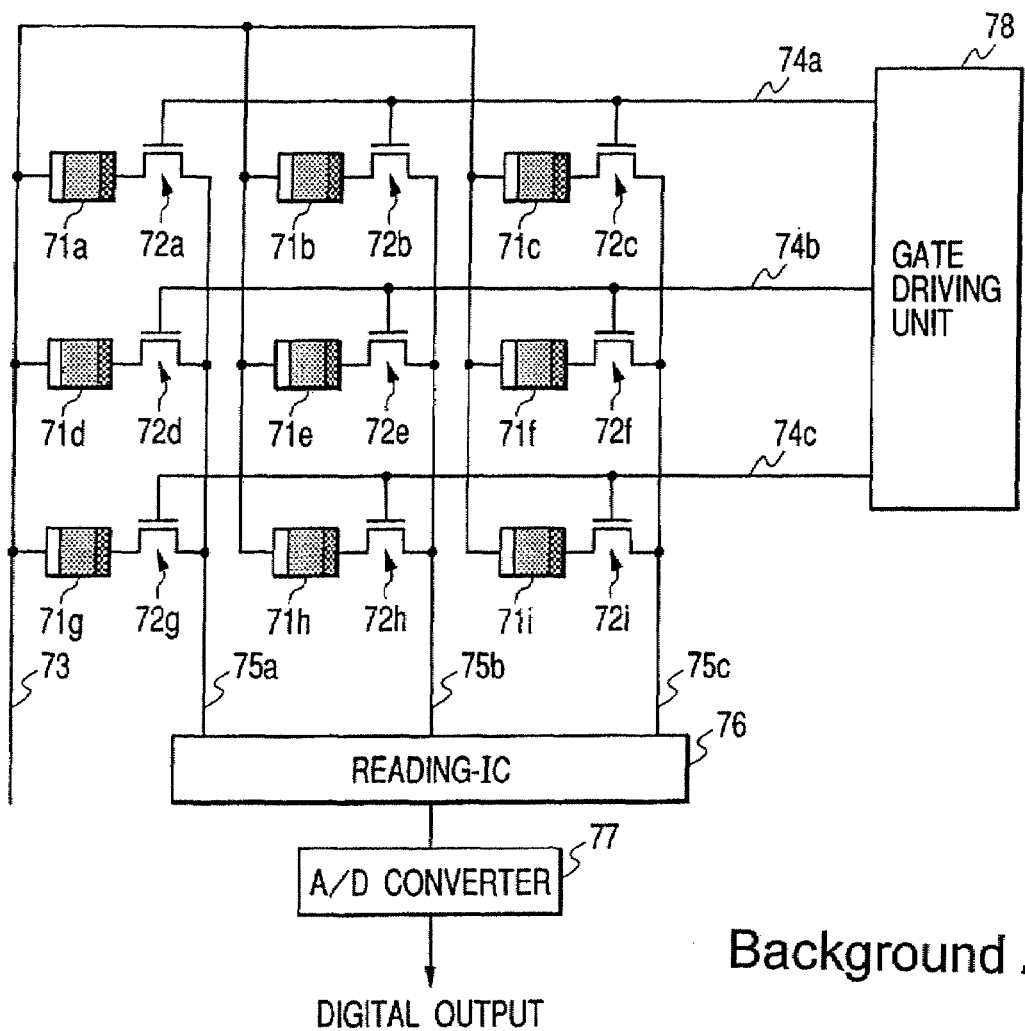
FIG. 7 shows the prior art, and functionally shows the construction of a secondary sensor.
Figure 8:
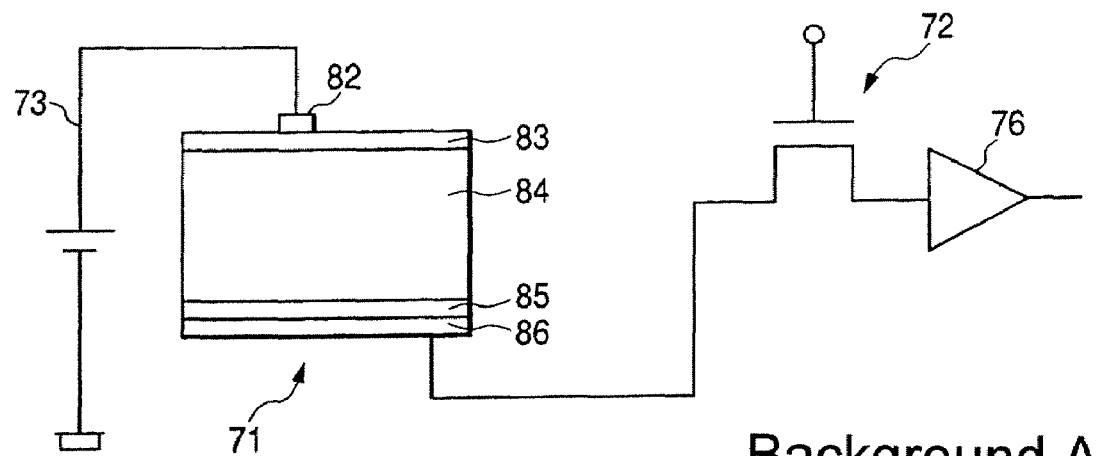
FIG. 8 shows the prior art, and shows the equivalent circuit of pixels constituting the secondary sensor.

FIG. 5 illustrates an example of the processing carried out by an pre-processing program incorporated in the radiation imaging apparatus.

In FIG. 5, the reference numeral 160 denotes the pre-processing program, the reference numeral 161 designates a radiation image for sensitivity correction, the reference numeral 162 denotes a dark current image for sensitivity correction, the reference numeral 163 designates a radiation image, the reference numeral 164 denotes a dark current image, the reference characters 65W and 65X designate subtractors, the reference characters 66W and 66X denote logarithmic converters, the reference numeral 67 designates a subtractor, the reference numeral 68 denotes a defect correction program, and the reference numeral 69 designates an image after ante-processing.

First, the radiation imaging apparatus is operated in the factory to thereby produce the initial defect map 1 and the pseudo-defect map 3. The method of producing the initial defect map 1 and the pseudo-defect map 3 is as shown in the first and second embodiments. The produced initial defect map 1 and pseudo-defect map are preserved in the recording unit 60.

Next, the radiation imaging apparatus is installed in the market and preparations for operation are made. An installing worker depresses the exposure button 58 in the absence of the patient 52 to thereby generate radiation and photograph the radiation image 161 for sensitivity correction and the dark current image 162 for sensitivity correction.

These images 161 and 162 generated from the radiation detector 55 are inputted to the subtractor 65W, where the dark current correction shown in expression (1) is effected, and further the images are inputted to the logarithmic converter 66W, where they are logarithmically converted, and then are preserved in the recording unit 60 through the bus line 61. At the same time, the QC defect map 2 is produced by the use of these images 161 and 162, and is likewise preserved in the recording unit 60.

When an operator sets the patient 52 in a good posture and depresses the exposure button 58 after the preparations for operation have been finished, the radiation image 163 and the dark current image 164 are continuously photographed substantially at a time. These images 163 and 164 are inputted to the subtractor 65X, where the dark current correction shown in expression (1) is effected, and further the images are inputted to the logarithmic converter 66X, where they are logarithmically converted.

Next, these images 163 and 164 and the images 161 and 162 for sensitivity correction called out of the recording unit 60 are inputted to the subtractor 67, where the sensitivity correction shown in expression (2) is effected.

Further, this sensitivity-corrected patient image 34 and the initial defect map 1, the QC defect map 2 and the pseudo-defect map 3 called out of the recording unit 60 are inputted to the defect correction program 68 and defect correction is effected. The defect correcting method is as shown in the aforedescribed first and second embodiments. Also, as shown in FIG. 6, a method of producing the interpolated image 38 produced by the use of the combined defect map 4 and the image 69 after ante-processing produced by the use of the interpolated image 38 is as previously described.

As a result of these, the image 69 after pre-processing is obtained as an output. Further, the image 69 after pre-processing is subjected to image processing suited for diagnosis by an image processing program, not shown, and is displayed as a diagnostic image on the display unit 59.

As described above, according to the present embodiment, there can be provided a radiation imaging apparatus having the effect in the aforedescribed first and second embodiments. That is, useless defect correction in the primary sensor and the secondary sensor incorporated in the radiation detector 55 is curtailed and the yields of the primary sensor and the secondary sensor can be improved and therefore, there can be provided a radiation imaging apparatus of low cost.

While in the present embodiment, defect correction is designed to be effected on a logarithmic image, this does not restrict the scope of the present invention, but defect correction may be effected on a linear image to obtain a similar effect.

Also, while in the above-described first to third embodiments, pixels of abnormal sensitivity of which the degree of sensitivity does not exceed ±0.01 are defined as pseudo-defective pixels, pixels defined as pseudo-defective pixels are not restricted to those of abnormal sensitivity. That is, any pixel of which the output can be practically used like an ordinary pixel by only the characteristic (function) of a part thereof being corrected may be defined as the pseudo-defective pixel. For example, a pixel of which the output can be practically used like the ordinary pixel if at least one of sensitivity, the stability of sensitivity, a dark current, the stability of the dark current and resolution is corrected may be defined as the pseudo-defective pixel. As a method of correcting the resolution, it is conceivable, for example, to apply a filter emphasizing the resolution only to the pseudo-defective portion.

Also, design is made such as to produce an initial defect map in which the initial defective pixels of the radiation detector having a plurality of pixels are registered, a pseudo-defect map in which the pseudo-defective pixels of which only the function of a part need be corrected are registered, and a QC defect map in which defective pixels discovered by periodical inspection are registered, and produce the combined defect map in which pixels for effecting defect correction are registered, by the use of the initial defect map, the pseudo-defect map and the QC defect map, and therefore, it becomes possible to eliminate the pseudo-defective pixels from the object of defect correction. Accordingly, it becomes realizable to curtail useless defect correction.

Particularly, even if periodical inspection for discovering defective pixels is effected in the market, pseudo-defective pixels can be eliminated from the object of defect correction and therefore, it becomes realizable to curtail useless defect correction.

Other Embodiments of the Present Invention

The category of the present invention also covers an embodiment in which so as to operate various devices to realize the functions of the above-described embodiments, the program code of software for realizing the functions of the aforedescribed embodiments is supplied to an apparatus connected to the various devices or a computer in a system, and the various devices are operated in accordance with a program stored in the computer (CPU or MPU) of the system or the apparatus to thereby carry out the present invention.

Also, in this case, the program code itself of the aforementioned software realizes the function of the above-described embodiments, and the program code itself, and means for supplying the program code to the computer, for example, a recording medium storing such a program code therein, constitutes the present invention. As the recording medium storing such a program code therein, use can be made, for example, of a flexible disk, a hard disk, an optical disk, a CD-ROM, a magnetic tape, a non-volatile memory card, a ROM or the like.

Also, such a program code is of course also included in the embodiment of the present invention in a case where the computer executes the supplied program code, whereby not only the function of the above-described embodiments is realized, but also the function of the above-described embodiments is realized jointly with an operating system (OS) in which the program code is working in the computer or other application software or the like.

Further, of course, the present invention is also included in a case where the supplied program code is stored in a memory provided in the function expanding board of the computer or a function expanding unit connected to the computer, whereafter on the basis of the instructions of the program code, a CPU or the like provided in the function expanding board or the function expanding unit effects part or the whole of actual processing, and the function of the above-described embodiments is realized by the processing.

As described above, according to the present invention, the quality of a radiation image can be improved.

What is claimed is:

1. A radiation imaging method using a radiation detector having a plurality of pixel groups, comprising:
   a first map producing step for producing a first defect map for registering therein positions of defective pixels not functioning as pixels from the plurality of pixel groups;
   a second map producing step for producing a second defect map for registering therein positions of pseudodefective pixels, a pseudodefective pixel differing from an ordinary pixel in at least one of sensitivity, a dark current and stability; and a combined defect map producing step for producing a combined defect map in which a pixel group for effecting defect correction is registered, on the basis of the first defect map and the second defect map, wherein the positions of the pseudodefective pixels are excepted from the positions of the defective pixels to thereby produce the combined defect map.

2. A radiation imaging method according to claim 1, wherein the first map producing step has a step of detecting the defective pixels at least two points of time or/and by at least two methods, and the positions of the defective pixels detected at each step are registered as the first defect map.

3. A radiation imaging method according to claim 1, further comprising a defect correcting step of effecting defect correction by use of the combined defect map.

4. A radiation imaging method according to claim 3, wherein the defect correcting process comprises a levelling process.

5. A radiation imaging method according to claim 4, wherein the levelling process substitutes the output of a marked pixel for a numerical value calculated by the use of both of the output of the marked pixel and the outputs of ambient pixels surrounding the marked pixel.

6. A radiation imaging method according to claim 1, wherein the pseudodefective pixels are defect-corrected when they reach saturation.

7. A radiation imaging apparatus provided with a radiation detector having a plurality of pixels, a recording unit for storing therein a defective pixel map and program of the radiation detector, and a controller for effecting control including an operation of executing the program, wherein the defective pixel map is a first defect map in which the position of an initial defective pixel is registered, a second defect map in which the position of a pseudodefective pixel is registered the pseudodefective pixel differing from an ordinary pixel in at least one of sensitivity, a dark current and stability, and a third defect map in which the position of a defective pixel discovered by periodical inspection is registered, and the controller produces a combined defect map in which a pixel for effecting defect correction is registered, by the use of the first defect map, the second defect map and the third defect map, and stores it in the recording unit, wherein the controller is arranged to produce the combined defect map by excepting the position of the pseudodefective pixel from the position of a defective pixel.

8. A radiation imaging apparatus according to claim 7, wherein the controller effects defect correction by the use of the combined defect map.

9. A computer-readable recording medium that stores a computer program for causing a computer to execute:

a first map producing step for producing a first defect map for registering therein the position of defective pixels not functioning as the pixels of a radiation detector having a plurality of pixel groups;

a second map producing step for producing a second defect map for registering therein the position of pseudodefective pixels, a pseudodefective pixel differing from an ordinary pixel in at least one of sensitivity, a dark current and stability; and a combined defect map producing step for producing a combined defect map in which a pixel group for effecting defect correction is registered, on the basis of the first defect map and the second defect map, wherein the positions of the pseudodefective pixels are excepted from the positions of the defective pixels to thereby produce the combined defect map.

* * * * *